United States Patent
Wendt et al.

(10) Patent No.: US 12,404,974 B2
(45) Date of Patent: Sep. 2, 2025

(54) HYDROGEN TANK, METHOD OF COOLING A HYDROGEN TANK, AND VEHICLE HAVING A HYDROGEN DRIVE AND HYDROGEN TANK

(71) Applicant: ArianeGroup GmbH, Taufkirchen (DE)

(72) Inventors: Christian Wendt, Bremen (DE); Armin Isselhorst, Bremen (DE); Martin Konopka, Bremen (DE)

(73) Assignee: ArianeGroup GmbH, Taufkirchen (DE)

( * ) Notice: Subject to any disclaimer, the term of this patent is extended or adjusted under 35 U.S.C. 154(b) by 239 days.

(21) Appl. No.: 17/976,938

(22) Filed: Oct. 31, 2022

(65) Prior Publication Data

US 2023/0139191 A1    May 4, 2023

(30) Foreign Application Priority Data

Nov. 2, 2021    (DE) .......................... 102021128436.8

(51) Int. Cl.
  *F17C 1/16*    (2006.01)
  *F17C 1/14*    (2006.01)

(52) U.S. Cl.
  CPC .................. *F17C 1/16* (2013.01); *F17C 1/14* (2013.01); *F17C 2203/03* (2013.01); *F17C 2203/0607* (2013.01); *F17C 2221/012* (2013.01)

(58) Field of Classification Search
  None
  See application file for complete search history.

(56) References Cited

U.S. PATENT DOCUMENTS

| | | | |
|---|---|---|---|
| 3,304,728 | A | 2/1967 | Haan |
| 8,460,408 | B2 * | 6/2013 | Inoue ........................ F17C 7/02 |
| | | | 422/211 |
| 9,777,889 | B2 | 10/2017 | Leachman et al. |
| 10,422,478 | B2 * | 9/2019 | Leachman ................ F17C 3/04 |

(Continued)

FOREIGN PATENT DOCUMENTS

| | | |
|---|---|---|
| DE | 102004035319 A1 | 2/2006 |
| DE | 102019118323 A1 | 1/2021 |

(Continued)

OTHER PUBLICATIONS

Kumar, Kaushik Zindani, Divya Davim, J. Paulo. (2020). Rapid Prototyping, Rapid Tooling and Reverse Engineering—From Biological Models to 3D Bioprinters—Chapter 2 Rapid Prototyping Processes (pp. 11-16). De Gruyter. (Year: 2020).*

(Continued)

*Primary Examiner* — Jenna M Maroney
(74) *Attorney, Agent, or Firm* — Greer, Burns & Crain, Ltd.

(57) ABSTRACT

A hydrogen tank having a tank structure at least partially delimiting a tank space and comprising a cooling shield formed in a lightweight construction. A conduit system, connected to the tank space, of a pressure relief system for discharging gaseous hydrogen from the tank space is formed in the cooling shield. At least one para-ortho catalyst for accelerated conversion of parahydrogen into orthohydrogen is arranged in the conduit system. Also a vehicle having a hydrogen drive and such a hydrogen tank, and a method for cooling the tank structure of such a hydrogen tank.

8 Claims, 3 Drawing Sheets

(56) References Cited

U.S. PATENT DOCUMENTS

| | | | |
|---|---|---|---|
| 2009/0199574 A1 | 8/2009 | Hirose et al. | |
| 2011/0302933 A1 | 12/2011 | Immel | |
| 2013/0299501 A1* | 11/2013 | Lee | F17C 1/005 220/560.04 |
| 2021/0002060 A1 | 1/2021 | Wendt et al. | |
| 2023/0139191 A1* | 5/2023 | Wendt | F17C 1/16 62/48.1 |

FOREIGN PATENT DOCUMENTS

| | | | | |
|---|---|---|---|---|
| EP | 1531300 A2 | * | 5/2005 | F17C 3/04 |
| JP | 56076800 A | * | 6/1981 | F17C 13/001 |
| KR | 102336892 B1 | * | 12/2021 | |
| WO | 2016022334 A1 | | 2/2016 | |

OTHER PUBLICATIONS

Swift, K.G. Booker, J.D.. (2013). Manufacturing Process Selection Handbook—From Design to Manufacture—8. Rapid Prototyping Processes. (pp. 227-241). Elsevier. (Year: 2013).*

J. K. Peng, et al., "Enhanced Dormancy Due to Para-to-Ortho Hydrogen Conversion in Insulated Cryogenic Pressure Vessels for Automotive Applications" International Journal of Hydrogen Energy, Argonne National Laboratory, Argonne, IL; 9 pages.

S. Ubaid, et al., "Effect of Para-Ortho Conversion on Hydrogen Storage System Performance" International Journal of Hydrogen Energy, Institut de Recherche Sur L'Hydrogene, Universite du Quebec, Quebec, Canada; 10 pages.

M. W. Liggett "Space-Based LH2 Propellant Storage System: Subscale Ground Testing Results" General Dynamics Spaces Systems Division, Hunstville, AL, USA; 5 pages.

J. Essler, "Physikalische und Technische Aspekte der Ortho-Para-Umwandlung von Wasserstoff" Doctoral Thesis, University of Dresden; 2013.

R. Bliesner, "Parahydrogen-Orthohydrogen Conversion for Boil-Off Reduction from Space Stage Fuel Systems" Master Thesis, Washington State University; 2013.

B. P. Pedrow, "Parahydrogen-Orthohydrogen Conversion on Catalyst Loaded Scrim for Vapor Cooled Shielding of Cryogenic Storage Vessels" Masters Thesis, Washington State University; 2016.

* cited by examiner

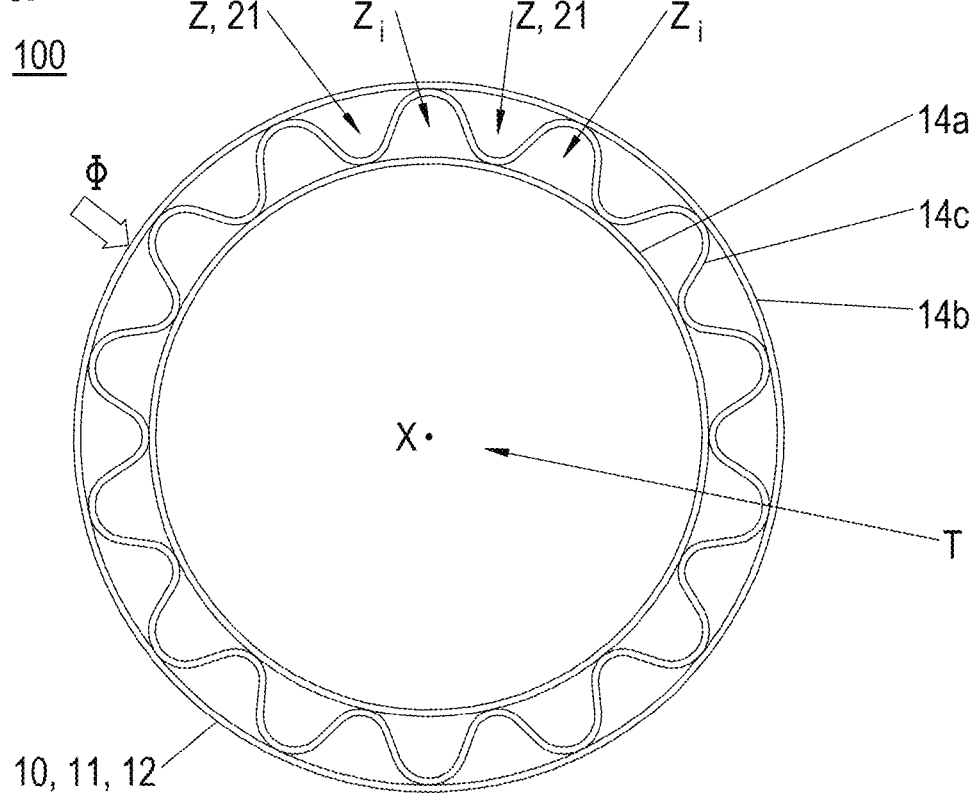
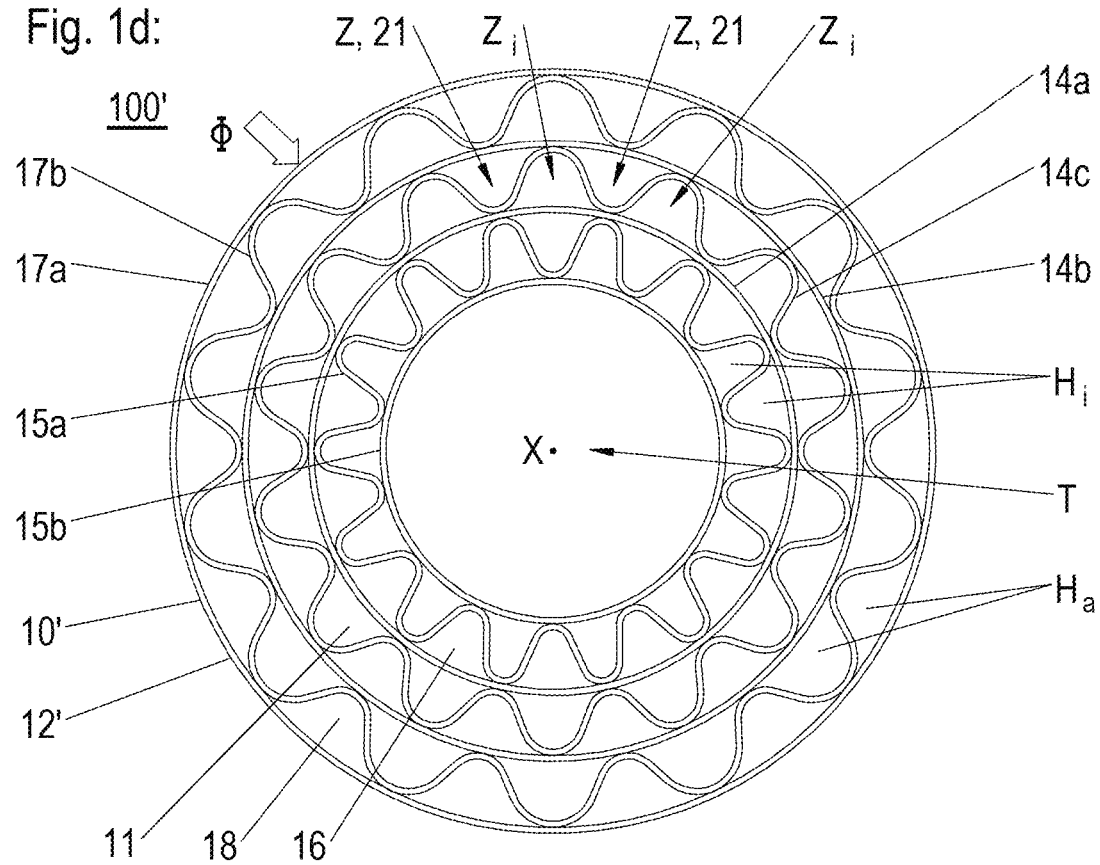

HYDROGEN TANK, METHOD OF COOLING A HYDROGEN TANK, AND VEHICLE HAVING A HYDROGEN DRIVE AND HYDROGEN TANK

CROSS-REFERENCES TO RELATED APPLICATIONS

This application claims the benefit of the German patent application No. 102021128436.8 filed on Nov. 2, 2021, the entire disclosures of which are incorporated herein by way of reference.

FIELD OF THE INVENTION

The present invention relates to a hydrogen tank. Furthermore, the invention relates to a vehicle with a hydrogen drive and a hydrogen tank for supplying the same.

BACKGROUND OF THE INVENTION

Hydrogen is used in a variety of applications, in particular as an energy carrier in industry and technology. It usually consists of orthohydrogen and parahydrogen, whose respective molecules differ by a spin of their atomic nuclei. The equilibrium ratio that naturally develops over time is temperature-dependent: While the parahydrogen fraction is almost 100% at temperatures up to the normal boiling point of about 20K, the orthohydrogen fraction increases with rising temperature and is about 75% from a temperature of about 250K. The conversion from parahydrogen to orthohydrogen is endothermic and accordingly, the reverse conversion is exothermic. Both conversions are naturally slow but can be accelerated by catalysts. Tanks are usually used almost exclusively for storing parahydrogen.

As with other cryogenic liquids, however, the storage of liquid hydrogen in mobile as well as in stationary tanks is problematic because in the case of heat input into the respective tank, the liquid hydrogen evaporates, which increases the tank pressure.

This is usually partially prevented, in particular with various tank insulation measures; for example, document DE 10 2019 118 323 A1 discloses a tank for storing liquid or gaseous substances which comprises a fiber-reinforced plastic sheathing with an evalcuable sandwich structure for thermal vacuum insulation.

In the automotive sector, catalysts for endothermic para-ortho conversion are used to reduce evaporation losses; such tank systems are known from US 2009/0199574 A1, US 2011/0302933 A1, the dissertation "Physikalische und technische Aspekte der Ortho-Para Umwandlung von Wasserstoff" by J. Essler (University of Dresden, 2013), the publication "Enhanced dormancy due to para-ortho hydrogen conversion in insulated cryogenic pressure vessels for automotive applications" by K. Peng and R. K. Ahluwalia (in: International Journal of Hydrogen Energy, 38, (2013)) and the article "Effect of para-ortho conversion on hydrogen storage system performance" by S. Ubaid et al. (in: International Journal of Hydrogen Energy, 39, (2014)). The catalysts can be designed as additional conduits of the venting system in tank-external cooling shields. In such applications, the tank pressure is usually well above the critical pressure of hydrogen. The hydrogen can be bound by physisorption to porous inserts inside the tank.

The use of cooling shields for fuel tanks is also known in the aerospace field. For example, the paper "Parahydrogen-Orthohydrogen Conversion for Boil-Off Reduction from Space Stage Fuel Systems" by R. M. Bliesner (Master Thesis, Washington State University, (2013)), the publication "Parahydrogen-Orthohydrogen Conversion for Enhanced Vapor-Cooled Shielding of Liquid Oxygen Tanks" by R. M. Bliesner, J. W, Leachman and P. M. Adam (in Journal of Thermophysics and Heat Transfer, 28 (4), (2014)) and in the article "Parahydrogen-Orthohydrogen Conversion on Catalyst-Loaded Scrim for Vapor-Cooled Shielding of Cryogenic Storage Vessels" by B. P. Pedrow et al. (in: Journal of Thermophysics and Heat transfer, 35 (1), (2021)) describe cooling shields for liquid oxygen tanks fed with parahydrogen gas and having a catalyst for endothermic para-ortho conversion. In the publication "Space-based LH2 propellant storage system: subscale ground testing results" by. M. W. Liggett (in: Cryogenics, 33 (4), (1993)), a cooling shield for a liquid hydrogen tank in the space sector implemented by additional metallic conduits is disclosed.

SUMMARY OF THE INVENTION

The present invention is based on an object of providing a technique by means of which storage of liquid hydrogen can be improved. The invention is further based on an object of improving a vehicle having a hydrogen drive.

A hydrogen tank according to the invention has a tank structure which at least partially delimits a tank space for hydrogen and comprises a region designed in lightweight construction in which a conduit system of a pressure relief system is formed, which conduit system is connected to the tank space and serves for discharging gaseous hydrogen from the tank space. Here, at least one para-ortho catalyst is arranged in the conduit system for the accelerated conversion of parahydrogen into orthohydrogen.

Since heat is absorbed from the environment during such an endothermic conversion, the region designed in lightweight construction of the tank structure comprising the conduit system is used for cooling its surroundings, which is why it is referred to below as a "cooling shield" of the tank structure.

By means of the conduit system with para-ortho catalyst formed in the cooling shield, the present invention enables effective cooling of the tank structure by additionally utilizing the heat energy contained therein for the endothermic para-ortho conversion and thus extracting it from the tank structure. In this manner, a heat flow from the outside into the tank space can be minimized and thus an amount of hydrogen to be discharged from the hydrogen tank required for a necessary pressure relief can be kept relatively small. Thus, evaporation losses are minimized.

In particular, the cooling shield of a hydrogen tank according to the invention thus has a thermally insulating effect.

According to advantageous embodiments of the present invention, the tank structure comprises at least one substructure in which at least one evacuable or evacuated hollow volume is formed for isolating the tank space. Preferably, a wall delimiting such a hollow volume withstands an internal pressure in the range of 0.0001 hPa to 0.01 hPa in the hollow volume. In particular, the at least one substructure can include a connection to a vacuum pump for evacuating the at least one hollow volume. The at least one substructure can be designed as lightweight construction (like the cooling shield).

In particular, such a substructure (having at least one evacuable or evacuated hollow volume) can be arranged at least in certain regions on a side facing the tank space (i.e., between the cooling shield and the tank space), and/or such a substructure can be arranged at least in certain regions on a side of the cooling shield facing away from the tank space (i.e., between the cooling shield and an external environment of the hydrogen tank).

The lightweight construction of the cooling shield and/or (in corresponding embodiments) of the at least one substructure can be implemented (in each case) in particular at least partially in that the region and the substructure, respectively, is at least partially made of a foam material and/or in that the region and the substructure, respectively, comprises, e.g., a plurality of (preferably force-absorbing) material layers which are spaced apart from one another at least in certain regions and between which at least one cavity and/or a further material layer is arranged, the material of which has a lower density than at least one of its adjacent material layers; in corresponding embodiments, at least one such cavity can be/form the at least one evacuated or evacuable hollow volume mentioned above.

In such embodiments, one or more of the material layers can preferably be formed, at least in certain regions, as a continuous sheet-like structure. In particular, the plurality of material layers can form a sandwich structure. The material layers can differ from one another, at least partially, in their material composition or can consist, at least partially, of the same materials. If they contact one another, they can be distinguished from one another in their contact region by an inhomogeneity in the material transition (so that the material layers are separate layers, i.e., not merely delimited from one another by an abstract boundary); in particular, they may be adhesively bonded or welded to one another.

The cooling shield is preferably formed with an integrated support structure, i.e., it also has a load-bearing function in addition to its cooling or insulating function. This means that separate support structures can be at least partially dispensed with when used in a vehicle. Compared to other hydrogen tanks, such an embodiment therefore enables a reduction of structural mass and thus a minimization of fuel losses.

A vehicle according to the present invention includes a hydrogen drive (i.e., a drive that uses hydrogen at least as a fuel component) and, for supplying hydrogen thereto, at least one hydrogen tank according to an embodiment of the present invention.

A method according to the present invention is used for cooling the tank structure of a hydrogen tank according to an embodiment of the present invention. It comprises passing gaseous hydrogen from the tank space of the hydrogen tank through the conduit system and discharging the hydrogen into an environment of the hydrogen tank.

A tank content of the tank space preferably comprises, in addition to the gaseous hydrogen, also liquid hydrogen having a parahydrogen content (as compared to orthohydrogen) of at least 90%, more preferably of at least 95%. When passing the flow through the conduit system of the cooling shield of the tank structure, the para-ortho catalyst arranged in the conduit system converts part of the parahydrogen into orthohydrogen in an endothermic reaction. As a result, heat is extracted from the cooling shield and the tank structure is cooled in this manner.

When it is introduced into the conduit system, the gaseous hydrogen preferably has a temperature in the range of 30K to 70K. Preferably, passing gaseous hydrogen through the conduit system in the cooling shield occurs until the hydrogen exiting the conduit system has a temperature in the range of 50K to 200K (i.e., is heated to such a temperature). In this manner, at least approximately loss-free storage of liquid hydrogen at a temperature of about 20K in the tank compartment can be achieved.

In particular, a method according to the invention thus comprises pressure relief of the hydrogen tank. In this manner, the gaseous hydrogen in the tank space can be repeatedly brought to a low level and stabilized there with low evaporation losses, despite a heat input acting on the hydrogen tank from the outside. The pressure relief can be repeated several times during operation of a hydrogen drive powered by hydrogen from the hydrogen tank, or it can be performed continuously.

Preferably, the cooling shield of a hydrogen tank according to the invention is configured to convert parahydrogen by means of a catalyst at least at temperatures of the cooling shield in the range from 50K to 200K until a ratio V of orthohydrogen to parahydrogen is reached which deviates from a respective equilibrium ratio G(T) (depending on the respective temperature T) by at most 10% or by at most 5%. Analogously, the hydrogen discharged according to a method according to the invention has preferably a ratio V of orthohydrogen to parahydrogen which deviates from a respective equilibrium ratio G(T) (depending on the respective temperature T) by at most 10% or by at most 5%. In such embodiments, it thus holds in each case that $0.9G(T) \leq V$ and $0.95G(T) \leq V$, respectively.

A hydrogen tank according to the invention can in particular be configured to be used in a vehicle (e.g., an air, space, ground and/or water vehicle) with hydrogen drive (which is thus configured to use hydrogen at least as a fuel component), or it can already be installed in such a vehicle. A vehicle according to the invention can in particular be designed as an air, space, ground and/or water vehicle.

According to advantageous embodiments, the tank space of a hydrogen tank according to the invention is formed to be substantially pivotably or rotationally symmetrical about an (abstract) central axis. It can be delimited, for example, by a tank wall which is part of the tank structure and is formed along a prism or a circular cylinder, and/or by at least one pivotably or rotationally symmetrically formed tank dome which is part of the tank structure and through which the central axis extends. In such embodiments, the cooling shield can at least partially comprise the tank wall and/or at least one such tank dome; in particular, the conduit system can then be formed at least partially in the tank wall and/or in the at least one tank dome.

The conduit system serves to effectively guide the gaseous hydrogen acting as a coolant in the tank structure. It can comprise one or more continuous (unbranched) cooling channel(s) or form at least one branch or branches. In embodiments where multiple material layers of the cooling shield form a sandwich structure (as mentioned above), such a branched conduit system can be formed by border strips of cells contained in the sandwich.

The para-ortho catalyst is preferably formed at least partially as an internal coating of at least one region of a boundary of the conduit system. In particular, it can comprise iron oxide, nickel-silicon, chromium trioxide and/or a porous magnetic material.

With respect to a material thickness of the cooling shield (in cross-section), the conduit system can extend at least in certain regions through a central and/or through an outer (i.e., away from the tank space) cross-sectional region of the tank structure. As a result, an effective removal of heat can be implemented with a minimum requirement for evaporation gas and a minimum requirement for structural mass, and thus the heat input from the outside into the tank structure can be reduced particularly effectively. In particular, at least a portion of the conduit system can preferably extend through a central cross-sectional region in embodiments having a prismatic or circular cylindrical tank wall as mentioned above, and preferably through a central or outer cross-sectional region in embodiments having at least one pivotably or rotationally symmetrical tank dome through which a central axis extends.

Preferably, the conduit system is at least partially delimited by two or more (separate) material layers of the cooling shield, thus, is formed as a hollow interspace between the at least two material layers. In particular, preferably at least one of the material layers can have corrugations and/or surfaces angled with respect to one another (in particular, running along prisms), which at least partially delimit at least one region of the conduit system.

According to advantageous embodiments, the tank structure, in particular preferably its cooling shield, is at least partially made of a lightweight material, for example of plastics, fiber-reinforced composite, aluminum and/or at least one aluminum alloy.

The tank structure can thus have a particularly low mass, so that its transport (in particular in a vehicle with a hydrogen drive, for the supply of which the hydrogen tank serves) can be carried out in a particularly energy-saving manner.

In corresponding embodiments with multiple material layers, in particular at least one of the material layers can preferably consist at least partially of fiber-reinforced composite material; such a layer of fiber-reinforced composite material can in particular serve as a support structure and thus at least partially effect an advantageous load-bearing design of the cooling shield.

In the following, preferred exemplary embodiments of the invention are explained in more detail with reference to drawings. It is understood that individual elements and components can also be combined differently than shown. Reference signs for corresponding elements are used across the figures and are possibly not described anew for each figure.

BRIEF DESCRIPTION OF THE DRAWINGS

In the figures, schematically:

FIG. 1c shows the hydrogen tank according to the invention of FIGS. 1a, 1b in cross-section;

FIG. 1d shows an advantageous hydrogen tank according to an exemplary embodiment of the present invention in cross-section; and, FIG. 2 shows a schematic drawing of a vehicle with a hydrogen tank according to the present invention.

DETAILED DESCRIPTION OF THE PREFERRED EMBODIMENTS

Figure 1A:
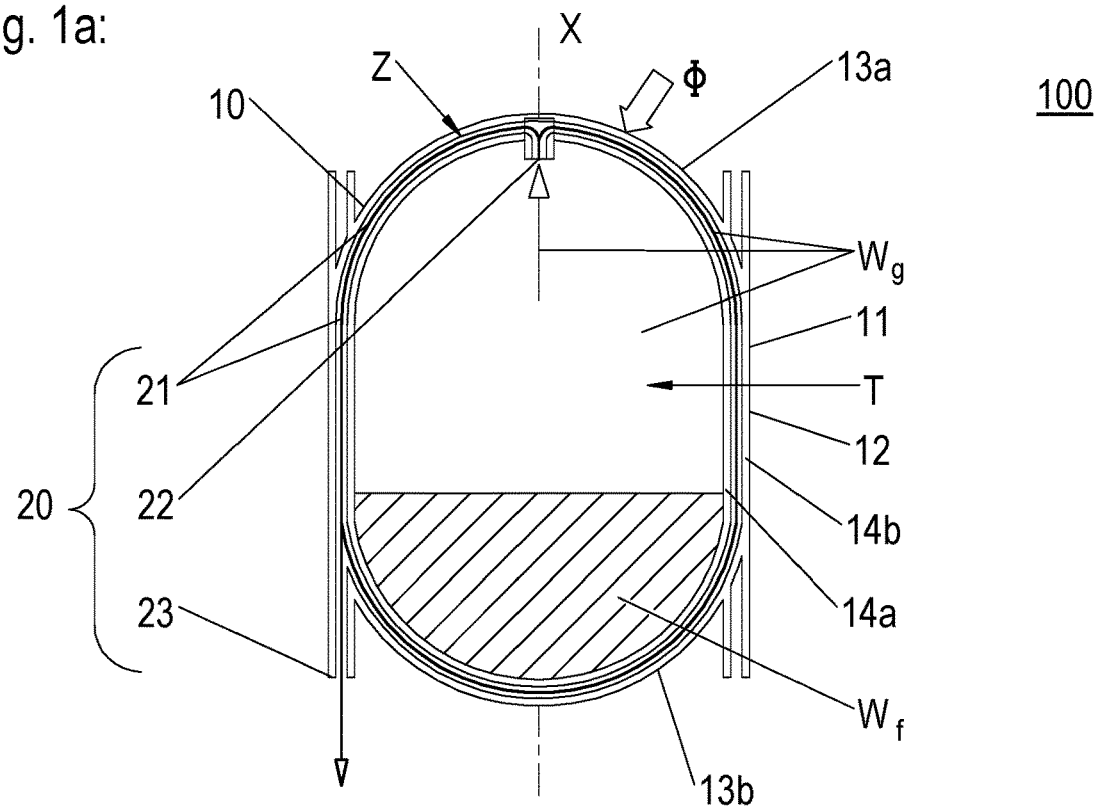
FIG. 1a shows an exemplary embodiment of a hydrogen tank according to the invention as a tank of a space vehicle during a thrust phase in a longitudinal section.

FIG. 1a schematically shows a hydrogen tank 100 according to an exemplary embodiment of the present invention. The hydrogen tank has a tank structure 10 surrounding and delimiting a tank space T. The tank structure 10 comprises a cooling shield 11 in which a conduit system 21 of a pressure relief system 20 is formed. Through the inlet 22 thereof, gaseous hydrogen Wg can flow from the tank space into the conduit system 21 to then flow through the conduit system 21 and to be discharged into an environment of the hydrogen tank 100 through an outlet 23 of the pressure relief system 20. A para-ortho catalyst (not visible in the figure) is arranged in the conduit system 21 for accelerated conversion of parahydrogen into orthohydrogen. The para-ortho catalyst is preferably formed as a coating of at least one region of a boundary of the conduit system 21 in the cooling shield 11. In particular, the catalyst can comprise iron oxide, nickel silicon, chromium trioxide and/or a porous magnetic material and it ensures that parahydrogen in the gaseous hydrogen Wg flowing through the conduit system 21 is partially converted into orthohydrogen. Since the endothermic conversion extracts heat from the cooling shield 11, the tank structure 10 is additionally cooled in this manner and therefore a heat flow—Φ—acting on the hydrogen tank 100 from the outside is at least partially offset. In this manner, pressure relief necessary for regulating the tank pressure can be used for effective cooling so that evaporation losses can be minimized.

In the present case, the tank space is rotationally symmetrical about an (abstract) central axis X along which the hydrogen tank 100 is shown in section in FIG. 1a.

The tank space T is bounded here by a tank wall 12 and two tank domes 13a, 13b. The tank wall 12 is formed along a circular cylinder about the central axis X. The tank domes 13a, 13b are each formed as spherical sections through which the central axis X extends. The inlet 22 of the pressure relief system 20 is arranged in the region of extent of the central axis X through that tank dome 13a which, in an intended installation orientation of the hydrogen tank in a vehicle (not shown), is opposite a tank space region in which the liquid hydrogen Wf accumulates under the influence of the earth's gravity or—if the vehicle is equipped for space applications—under the influence of inertia during thrust: This situation is shown in FIG. 1a.

Figure 1B:
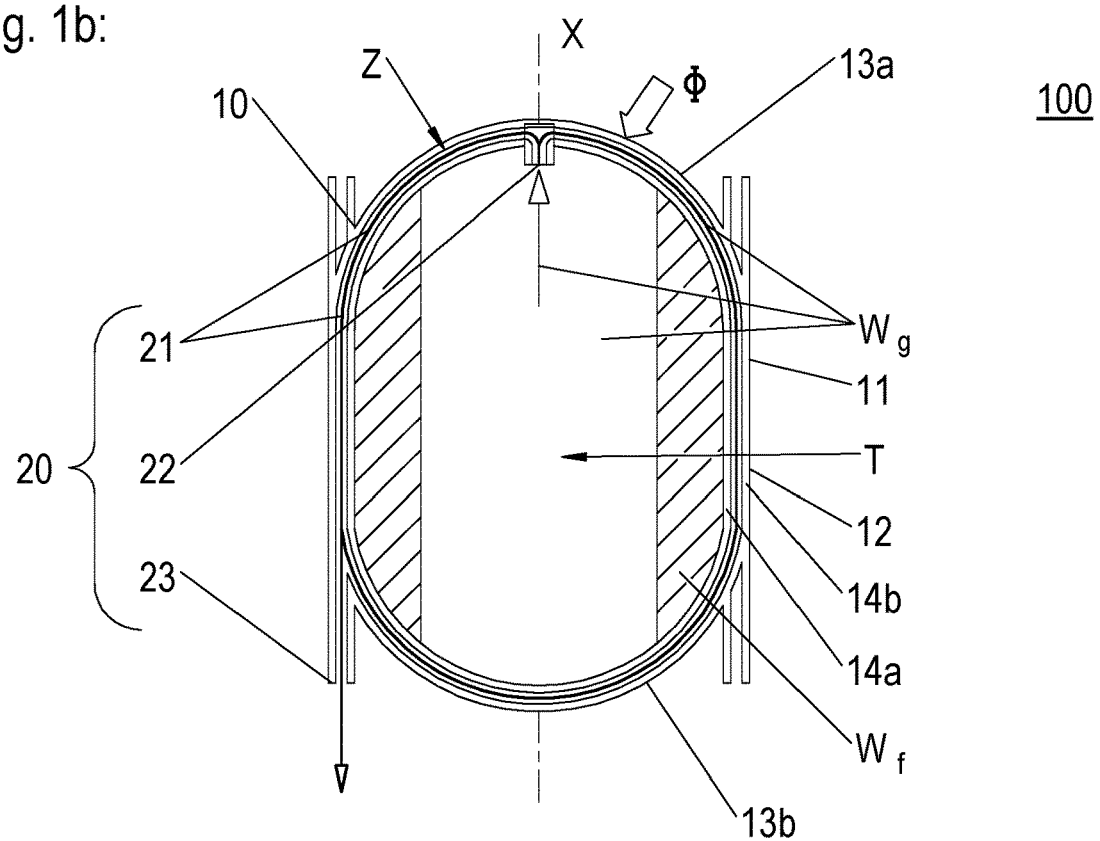
FIG. 1b shows the hydrogen tank of FIG. 1a during a ballistic flight phase of the space vehicle.

In contrast, FIG. 1b shows the hydrogen tank 100 installed in the intended installation orientation in a space vehicle (not shown) in a situation in which the space vehicle rotates about the central axis X during a ballistic phase: In this situation, the liquid hydrogen Wf is forced radially outwards with respect to the central axis X and thus against the tank wall 12 due to the centrifugal force.

In both situations, the liquid hydrogen Wf is spaced apart from the inlet 22 of the pressure relief system 20 into the conduit system 21, preventing it from entering the conduit system.

The tank structure 10 is shown in FIGS. 1a and 1b in each case in simplified form with two flat layers of material 14a, 14b between which at least one interspace Z is formed. Thus, a lightweight construction of the tank structure is implemented. Preferably, at least one of the flat material layers consists at least partially of a lightweight material such as, for example, plastics, fiber-reinforced composite, aluminum and/or at least one aluminum alloy. Preferably, at least one of the material layers can provide the cooling shield with a load-bearing function.

As can further be seen in FIGS. 1a and 1b, the interspace Z forms at least part of the conduit system 21 in the embodiment shown.

FIG. 1c schematically shows the hydrogen tank 100 cut perpendicular to the central axis X and in the region of the tank wall 12 (and also with modified dimensions to illustrate the structure). It is apparent from this illustration that between the material layers 14a and 14b, a corrugated material layer 14c is arranged as a further material layer, the corrugations of which in contact with the material layer 14a arranged further out even delimit a plurality of interspaces Z, of which only two are provided with reference signs in FIG. 2 for the sake of clarity. In contact with the material layer 14b arranged further inwards (in relation to the tank space T or the central axis X), the corrugated material layer 14c delimits further interspaces Zi.

The respective outer interspaces Z form at least part of the conduit system 21 with the para-ortho catalyst (not shown). When gaseous parahydrogen is passed through the conduit system 21, the outer material layer 14b, in particular, is cooled and thus a heat flow Φ from the outside is at least partially offset. Alternatively or additionally, the further interspaces Zi can form part of the conduit system 21 with the para-ortho catalyst (not shown in the figure).

In particular, the para-ortho catalyst can comprise one or more region(s) in which it is formed as a respective coating of at least part of one or more respective wall(s) of the interspaces Z and/or the interspaces Zi.

As an alternative to the corrugated shape (wave shape), the material layer 14c could comprise sections angled with respect to each other, in particular formed in a jagged manner (not shown).

FIG. 1d schematically illustrates a particularly advantageous hydrogen tank 100' according to a further exemplary embodiment of the present invention in a cross-sectional view. The hydrogen tank 100' can in particular be spherical or have a circular-cylindrical tank wall; the cross-section shown is taken perpendicular to its central axis X in the present case.

The hydrogen tank 100' has a tank structure 10' which has a cooling shield 11 which is formed analogously to the cooling shield 11 of the tank structure 100 shown in FIG. 1c and is therefore designated here in the same way and will not be described again.

Moreover, the tank structure 10' of the hydrogen tank 100' comprises material layers 15a and 15b each on a side of the cooling shield 11 facing the tank space T (thus, between the tank space T and the cooling shield 11) and material layers 17a and 17b on a side of the cooling shield 11 facing away from the tank space (thus, further out than the cooling shield 11 with respect to the tank space).

The material layers 15a and 17b in the present case are each corrugated (wave shaped) so that they are in contact with the respective adjacent material layers 14a, 15b and 14b, 17a and together with these respective material layers delimit cavities Ha, Hi, only two of which are marked with reference signs in FIG. 1d for the sake of clarity. Inside and outside the cooling shield 11 (in relation to the tank space T), the tank structure 10' thus has in each case a substructure 16 and 18, respectively, of lightweight construction like the cooling shield 11. In particular, the tank structure 10' in the present case shown in FIG. 1d comprises three corrugated plate cores, of which the middle one in the cross-section forms the cooling shield 11.

As an alternative to the corrugated shape, one or more of the material layers 14c, 15a, 17b could comprise sections angled with respect to one another, in particular be formed in jagged manner (not shown).

According to advantageous embodiments, one or more of the cavities Ha and/or one or more of the cavities Hi is/are connected to a vacuum pump, thereby forming an evacuable hollow volume in each case. As a result, a particularly good thermal insulation effect can be achieved.

Disclosed is a hydrogen tank 100 having a tank structure 10 which at least partially delimits a tank space T and comprises a cooling shield 11 designed in lightweight construction. A conduit system 21, connected to the tank space T, of a pressure relief system 20 for discharging gaseous hydrogen Wg from the tank space T is formed in the cooling shield 11. At least one para-ortho catalyst for accelerated conversion of parahydrogen into orthohydrogen is arranged in the conduit system.

Figure 2:
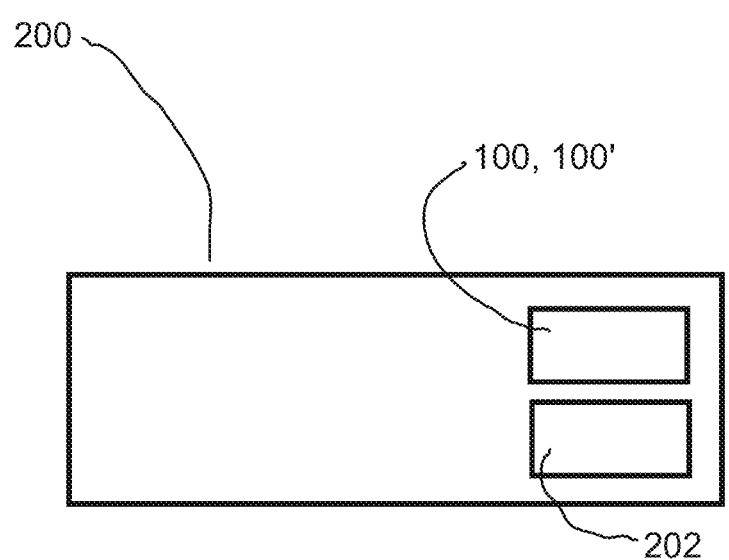

Also disclosed, as shown in FIG. 2, are a vehicle 200 with a hydrogen drive 200 and such a hydrogen tank 100, 100' and a method for cooling the tank structure of such a hydrogen tank.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST 10 tank structure
11 cooling shield
12 tank wall
13a, 13b tank dome
14a, 14b, 14c material layer
15a, 15b material layer
16 substructure on the side of the cooling shield 11 facing the tank space T
17a, 17b material layer
18 substructure on the side of the cooling shield 11 facing away from the tank space T
20 pressure relief system
21 conduit system
22 inlet
23 outlet
100 hydrogen tank
Φ heat flow
$H_i$, $H_a$ cavity
$W_f$ liquid hydrogen
$W_g$ gaseous hydrogen
T tank space
X central axis
Z interspace
$Z_i$ inner interspace

The invention claimed is:
1. A hydrogen tank, comprising
   a tank structure which at least partially delimits a tank space and comprises a region comprising a cooling shield,
   a conduit system, connected to the tank space, of a pressure relief system for discharging gaseous hydrogen from the tank space, being formed in the cooling shield,
   wherein at least one para-ortho catalyst for an accelerated conversion of parahydrogen into orthohydrogen is arranged in the conduit system,
   wherein the cooling shield has at least two separate material layers which form a sandwich structure and between which at least one hollow interspace is formed, which forms at least part of the conduit system.

2. The hydrogen tank according to claim 1, wherein the para-ortho catalyst is formed at least partially as an internal coating of at least a part of a boundary of the conduit system.

3. The hydrogen tank according to claim 1, wherein at least one of the material layers has at least one of corrugations or surfaces angled with respect to each other, which at least partially delimit the at least one interspace.

4. The hydrogen tank according to claim 1, wherein the tank structure further has a substructure in which at least one evacuable or evacuated hollow volume is formed for thermal insulation of the tank space.

5. The hydrogen tank according to claim 1, wherein the tank structure is at least partially made of at least one of plastics, fiber-reinforced composite, aluminum, or at least one aluminum alloy.

6. A vehicle having a hydrogen drive, which comprises at least one hydrogen tank according to claim 1 for supplying the hydrogen drive.

7. A method for cooling the tank structure of a hydrogen tank according to claim 1, wherein the method comprises:
passing gaseous hydrogen from the tank space of the hydrogen tank through the conduit system containing the at least one para-ortho catalyst, and
discharging the hydrogen into an environment of the hydrogen tank.

8. The method according to claim 7, further including a step of introducing the gaseous hydrogen, having a temperature in a range of 30K to 70K, from the tank space into the conduit system.

* * * * *